Feb. 21, 1939.       H. J. MURPHY       2,147,950
NUT FASTENER AND INSTALLATION
Filed March 4, 1937
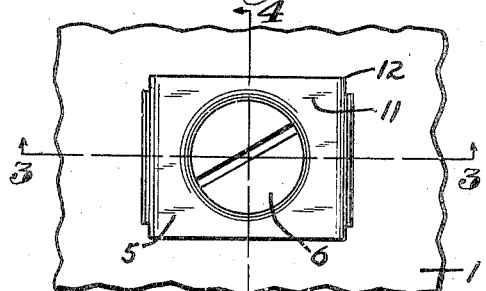
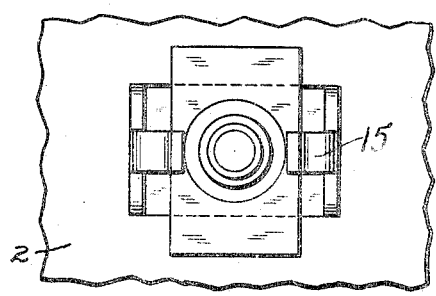
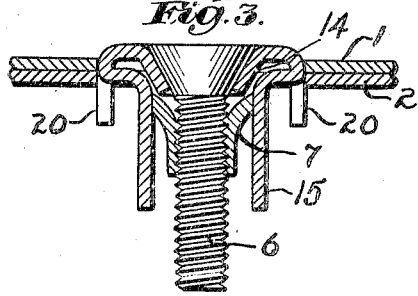
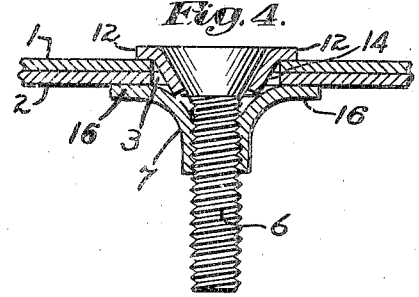
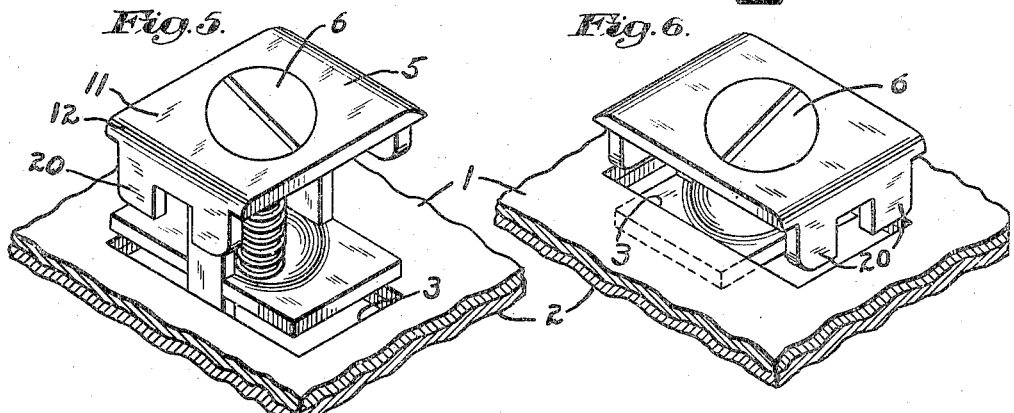
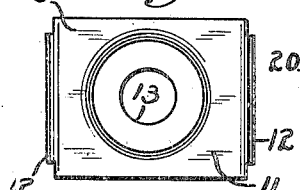
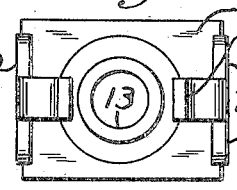
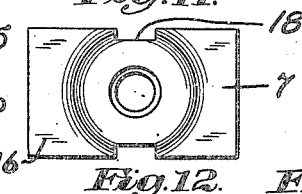
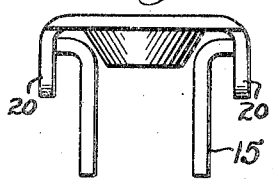
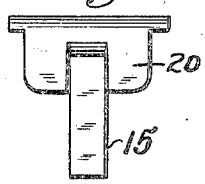
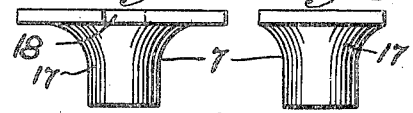
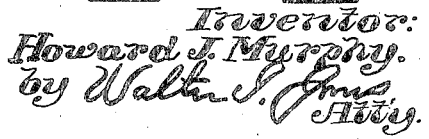
Inventor:
Howard J. Murphy
by Walter S. Ams
Atty.

Patented Feb. 21, 1939

2,147,950

UNITED STATES PATENT OFFICE 2,147,950

NUT FASTENER AND INSTALLATION

Howard J. Murphy, Greenwood, Mass., assignor to United-Carr Fastener Corporation, Cambridge, Mass., a corporation of Massachusetts Application March 4, 1937, Serial No. 128,935

12 Claims. (Cl. 85—1)

The present invention relates to improvements in installations for securing and clamping two or more parts together, as for example, a plurality of sheet metal plates, and more particularly to the construction of the metal fastener therefor.

The invention has for one of its aims and objects the improvement of fastener installations of the type where two or more parts, as for example, sheet metal plates, are to be secured and clamped together, and particularly those installations where only one side of the assembled plates is accessible to the operator for applying the fastening.

Other aims and objects of the invention will appear from the following more detailed description of the invention, reference being had to the accompanying drawing, which are illustrative of one preferred embodiment of the invention.

In the drawing

Fig. 1 is a plan view of a fastener installation as viewed from one side thereof;

Fig. 2 is a plan view of the same installation as viewed from an opposite side;

Fig. 3 is a sectional view taken on the line 3—3 of Fig. 1;

Fig. 4 is a sectional view taken on the line 4—4 of Fig. 1;

Fig. 5 is a detail perspective view illustrating the first step in assembling the fastener installation;

Fig. 6 is a similar view illustrating a second step in assembling the installation;

Figs. 7 and 8 are respectively top and bottom plan views of the clamping member;

Figs. 9 and 10 are respectively side and elevation views thereof;

Fig. 11 is a plan view of the nut member; and

Figs. 12 and 13 are respectively side and end elevations thereof.

In many installations, where it is necessary and desirable to bolt, clamp or secure two or more members together in assembled relation, access is available to only one side of the structure to permit workmen to apply and tighten the fastening device. Threaded fastening devices, as for example, those employing a threaded bolt or screw and cooperating nut member are preferably for many installations. As the nut member must be larger than the fastener receiving opening in the assembled parts, in order to provide a clamping surface bearing against the adjacent member, such bolt and nut fastener devices have heretofore not been generally available for ready use in certain installations of the type referred to.

According to my invention, novel fastener means are provided to secure two or more members together, which members may be of any construction, shape and material, but for convenience are illustrated as two sheet metal plates 1 and 2, provided with fastener-receiving apertures 3. These apertures may be of any desired size and of various shapes, preferably being of greater length along one axis than along a transverse axis, as for example, elliptical or rectangular shapes. As herein shown, the apertures are rectangular in shape, and advantageously the aperture 3 of each of the plates to be assembled is of like size and shape, though this is not essential to the invention.

The fastening device, according to the invention, comprises a clamping head 5, a bolt member 6 and a nut 7 adapted to be pre-assembled before application to the installation. In such pre-assembly the nut member is held against rotation by the bolt member, so that the entire pre-assembly may be applied to the installation as a unit, and thereafter relative clamping engagement between the clamping head and nut will be effected by simple rotation of the bolt.

The clamping head 5 (see Figs. 1 to 10) may be of any suitable construction, but for economy of manufacture may be formed from a single piece of sheet metal to provide a base 11, and lateral extending clamping portions 12 adapted to bear against a surface of the outer plate 1. The base 11 is formed with an aperture 13 to loosely receive the shank of the bolt, and the metal of the base surrounding the aperture 13 is preferably countersunk as at 14 to receive the head of the bolt in order that it may be flush with the base 11. As herein illustrated the countersunk portion 14 is formed with tapered walls to receive the tapered head of an ordinary bolt, and it will be apparent that the countersunk portion 14 may be otherwise shaped to receive any design of bolt head.

The clamping head 5 is preferably provided with spaced guide means adapted to cooperate with the sides of the nut member. These guide means are advantageously formed of thin flat strips of metal, as at 15, formed from the metal constituting the base and extending inwardly and then away from the base a substantial distance. The major portion of the guide means is disposed in spaced parallel relation on opposite sides of the opening 13 and is adapted to engage the sides of the nut member to prevent its rotation during tightening of the fastener installation. Preferably the spacing between the guide means 15 is slightly less than the width of the apertures 3.

The nut member 7 (see Figs. 11, 12 and 13) may advantageously be formed of a single piece of metal providing a size and shape with the openings 3. A bolt receiving barrel 17 may advantageously be drawn from the metal constituting the base and may be internally threaded (see Figs. 3 and 4) to cooperate with the threaded shank of the bolt 6. Preferably the sides of the base 16 are notched as at 18 to provide ways to receive the guide means 15 of the clamping head.

When it is desired to secure two members together, as for example, metal plates as illustrated at 1 and 2, which are accessible from only one side, for example as viewed in Figs. 3, 4, 5 and 6, the clamping head 5, bolt 6, and nut 7 are pre-assembled as illustrated in Fig. 5, with the major axes of the elongated head and nut at right angles to each other, and the guide means 15 in engagement with the recesses 18 of the nut. The parts are maintained in their pre-assembled condition for manipulation as a unit by reason of the threaded engagement of the shank of the bolt with the nut.

The clamping head 5, bolt 6 and nut 7, thus pre-assembled, may be applied as a unit to the assembled members 1 and 2 to be secured. The nut end of this fastener assembly is first inserted through the openings 3 of the members 1 and 2 as clearly illustrated in Fig. 5. After the nut proper is positioned beyond the innermost member 2, the fastener assembly is turned 90 degrees, as shown in Fig. 6, in which position the clamping head may fit within the opening 3 of the plate 1, with clamping flanges or portions 12 bearing upon the plate 1, while the major axis of the nut member 7 is disposed at right angles to the major axis of the aligned openings 3. Upon rotation of the bolt 6, by any suitable means, as for example, a screw device, the nut and clamping head are drawn together until the base of the nut tightly bears against the surface of the adjacent member 2. In this position the members 1 and 2 are tightly clamped and secured together by the clamping action between the base 16 of the nut 7 and the clamping portions 12 of the head 5, as is clearly shown in Fig. 4.

In many installations it is highly desirable not only to clamp together a plurality of members such as illustrated at 1 and 2, but also to prevent any relative rotative movement of one with relation to another. This may be readily accomplished by my invention by providing either the clamping head or nut, or both, with locating lugs adapted to engage the walls of the openings 3 of the members 1 and 2.

In the illustrated embodiment of the invention the clamping head 5 is formed with integral lugs 20, preferably on opposite ends so that they may fit within and bear upon the walls of the openings 3. Advantageously these lugs are of sufficient length as to extend beyond the innermost member 2, and therefore act to bear against the walls of the apertures 3 at points on opposite sides of the bolt 6, to prevent relative rotation of the plates 1 and 2.

Numerous advantages of the invention will be apparent to those skilled in the art. The clamping head and nut member may readily be made, each, of one piece construction by a stamping operation, facilitating a rugged construction at a minimum cost. The parts may be accurately made to insure accurate fitting of one to the other for pre-assembly.

While I have illustrated and described a preferred embodiment of the invention, I do not intend to be limited thereby, as obviously many minor departures are permissible while retaining the novel features of the invention, as defined by the following claims.

I claim:

1. An installation of the character described comprising a plurality of members adapted to be secured together, aligned elongated apertures in each of said members and a fastener assembly comprising a bolt and cooperating elongated head and nut, the major axes of said head and nut being in right-angular relation in all relative positions of the assembled parts, said nut conforming substantially to the size and shape of said opening, and said head being of greater size than said opening in at least one direction, said bolt, nut and head adapted to be inserted through said openings as a unit from one side of said members, said nut being adapted to be turned into transverse position relative to the major axes of said apertures whereby said fastener assembly is adapted upon rotation of said bolt to clamp said members securely between said head and nut.

2. An installation of the character described comprising a plurality of members adapted to be secured together, aligned apertures in each of said members, and a fastener assembly comprising a clamping head, bolt and nut adapted to be inserted through said openings as a unit from one side of said members, said head and nut parts of said fastener assembly each being elongated and normally disposed within their major axes at right angles, said head and nut parts adapted to be turned a determined number of degrees whereby said fastener assembly is adapted upon rotation of said bolt to clamp said members securely between the clamping head and nut.

3. An installation of the character described comprising a plurality of members adapted to be secured together, aligned apertures in each of said members, and a fastener assembly comprising a clamping head, bolt and nut adapted to be inserted through said openings as a unit from one side of said members, said head and nut parts of said fastener assembly each being elongated and normally disposed within their major axes at right angles, said head and nut parts adapted to be turned a determined number of degrees whereby said fastener assembly is adapted upon rotation of said bolt to clamp said members securely between the clamping head and nut, and means for preventing rotation of said nut relative to said clamping member as said bolt is rotated to effect clamping engagement.

4. An installation of the character described comprising a plurality of members adapted to be secured together, said members having aligned apertures with the aperture of one of said members at least being elongated, and a fastener assembly comprising a clamping head, bolt and nut, an elongated base on said nut, said head, bolt and nut adapted to be pre-assembled and inserted through said apertures as a unit with the major axis of said nut connecting with the major axis of said elongated aperture, and thereafter turned substantially 90 degrees so that portions of the base of said nut will overlie portions of said members, means to prevent rotation of said nut relatively to said head upon rotation of said bolt, whereby rotation of said bolt will cause said clamping head and nut to be drawn together to securely clamp said members in assembled relation between them.

5. An installation of the character described comprising a plurality of members adapted to be secured together, said members having aligned elongated apertures, and a fastener assembly comprising a clamping head, bolt and nut, an elongated base on said nut, said head, bolt and nut adapted to be preassembled and inserted through said apertures as a unit with the major axis of said nut connecting with the major axis of said apertures, and thereafter turned substantially 90 degrees so that portions of the base of said nut will overlie portions of said members, whereby rotation of said bolt will cause said clamping head and nut to be drawn together to securely clamp said members in assembled relation between them, and means on said fastener assembly engaging the walls of said apertures to prevent relative rotation of said members.

6. An installation of the character described comprising a plurality of members adapted to be secured together, said members having aligned elongated apertures, and a fastener assembly comprising a clamping head, bolt and nut, an elongated base on said nut, said head, bolt and nut adapted to be preassembled and inserted through said apertures as a unit with the major axis of said nut connecting with the major axis of said apertures, and thereafter turned substantially 90 degrees so that portions of the base of said nut will overlie portions of said members, whereby rotation of said bolt will cause said clamping head and nut to be drawn together to securely clamp said members in assembled relation between them, and means on said clamping head engaging the walls of said apertures to prevent relative rotation of said members.

7. A fastener assembly comprising in combination, a clamping head, a countersunk bolt-receiving opening therein, a separate laterally elongated nut member having a threaded bolt-receiving opening therein, a bolt loosely mounted in said clamping head and threadingly engaging said nut, and means for preventing rotation of said nut relative to said head.

8. A fastener assembly for clamping apertured members together comprising in combination, an elongated clamping head, a bolt-reciving opening therein, an elongated nut member having a threaded bolt-receiving opening therein, a bolt loosely mounted in said head and in threaded engagement with said nut, and means for maintaining said nut in position with its major axis at right angles to the major axis of the clamping head.

9. A fastener assembly for clamping apertured members together comprising in combination, an elongated clamping head, a bolt-receiving opening therein, an elongated nut member having a threaded bolt-receiving opening therein, said nut member being of greater length than at least one dimension of the aperture of said member, a bolt loosely mounted on said head and in threaded engagement with said nut, and means for maintaining said nut in position with its major axis at right angles to the major axis of the clamping head.

10. A fastener assembly for clamping apertured members together comprising in combination, an elongated clamping head, a bolt-receiving opening therein, an elongated nut member having a threaded bolt-receiving opening therein, a bolt loosely mounted in said head and in threaded engagement with said nut, and means for maintaining said nut in position with its major axis at right angles to the major axis of the clamping head, said fastener assembly including means engaging the walls of said apertured members for preventing relative rotation of said member.

11. A fastener assembly for clamping apertured members together comprising in combination, an elongated clamping head, a bolt-receiving opening therein, an elongated nut member having a threaded bolt-receiving opening therein, said nut member being of greater length than at least one dimension of the aperture of said member, a bolt loosely mounted on said head and in threaded engagement with said nut, and means for maintaining said nut in position with its major axis at right angles to the major axis of the clamping head, said fastener assembly including a plurality of lugs adapted to engage the walls of said apertured members for preventing relative rotation of said members.

12. A fastener assembly for clamping apertured members together comprising in combination, an elongated clamping head, a bolt-receiving opening therein, an elongated nut member having a threaded bolt-receiving opening therein, said nut member being of greater length than at least one dimension of the aperture of said member, a bolt loosely mounted on said head and in threaded engagement with said nut, and means for maintaining said nut in position with its major axis at right angles to the major axis of the clamping head, said clamping head being provided with a plurality of lugs located on opposite sides of said head for engaging the apertured walls of said members to prevent relative rotation therebetween.

HOWARD J. MURPHY.